United States Patent [19]

Mochizuki

[11] Patent Number: 5,610,896
[45] Date of Patent: Mar. 11, 1997

[54] OPTICAL RECORDING SYSTEM USING A GAS LASER CAPABLE OF OSCILLATING IN A SINGLE LONGITUDINAL MODE

[75] Inventor: Manabu Mochizuki, Yamanashi-ken, Japan

[73] Assignee: Pioneer Electronic Corporation, Tokyo, Japan

[21] Appl. No.: 496,293

[22] Filed: Jun. 29, 1995

[30] Foreign Application Priority Data

Aug. 11, 1994 [JP] Japan .................................. 6-210391

[51] Int. Cl.$^6$ ....................................................... G11B 7/00
[52] U.S. Cl. ............................................. 369/121; 369/112
[58] Field of Search .............................. 369/120, 44.34, 369/44.23, 44.24, 13, 116, 97, 112; 372/32, 19, 98

[56] References Cited

U.S. PATENT DOCUMENTS 3,810,106  5/1974  Nadler et al. .............................. 369/97
3,976,957  8/1976  Le Floch et al. .......................... 372/32
4,768,182  8/1988  Hatfield ..................................... 369/112
5,420,846  5/1995  Sugiyama ................................. 369/13

Primary Examiner—Nabil Hindi
Attorney, Agent, or Firm—Nikaido Marmelstein Murray & Oram LLP

[57] ABSTRACT

An optical recording system has a gas laser having an optical resonator for emitting a laser beam, and an optical modulator for modulating the laser beam in accordance with a signal to be recorded. An optical system is provided for focusing the modulated laser beam on the recording medium so as to record the signal. The optical resonator has an etalon and a wavelength selecting prism for selecting a single wavelength so that the gas laser oscillates the laser beam in a single longitudinal mode.

6 Claims, 5 Drawing Sheets

1

OPTICAL RECORDING SYSTEM USING A GAS LASER CAPABLE OF OSCILLATING IN A SINGLE LONGITUDINAL MODE

FIELD OF THE INVENTION

The present invention relates to an optical recording system suitable for recording a digital acoustic signal or forming a wobbled groove on a disc, and more particularly to a gas laser source provided in the system.

BACKGROUND OF THE INVENTION

In order to manufacture an optical disc such as a video disc, read-only digital audio disc and writable optical disc having prepits and pregrooves, a master disc is cut with a laser beam to record information thereon. In general, the master disc comprises a polished glass substrate on which a photoresist is applied. The photoresist is irradiated by a laser beam which is modulated in accordance with a signal to be recorded. The irradiated portions of the photoresist are thus developed and removed.

In order to record signals on the master disc, the surface of the disc is processed by cutting with a gas laser beam emitted from a gas laser. Namely, the gas laser beam is turned on and off by an optical modulator in accordance with the signal to be recorded. The emitted laser beam is transmitted through a mobile optical recording system and an objective, and applied to the photoresist on the glass substrate which is rotated by a spindle motor.

A conventional argon gas laser is a common gas laser as a cutting device for the disc.

Referring to FIG. 8, the gas laser has a gas-discharge tube 1 filled with argon gas, and a discharge device is provided in the tube. The tube 1 further has a first and second apertures 2 and 3 at both ends thereof. The gas laser is provided with an output mirror 4 and a rear mirror 5 which are disposed at the front and rear of the discharge tube 1, respectively, thereby forming an optical resonator. The output mirror 4, provided to confront the first aperture 2, comprises a partial reflecting mirror. The rear mirror 5, disposed at the end of a beam path, comprises a total reflecting mirror. A wavelength selecting prism 6 is disposed between the second aperture 3 of the discharge tube 1 and the rear mirror 5.

In operation, when excited, the discharge tube 1 oscillates a laser beam. The generated laser beam is resonated by the output mirror 4 and the rear mirror 5. Although the argon gas laser oscillates a laser beam having various wavelengths, the wavelength selecting prism 6 selects a spectrum at a predetermined range. Namely, as shown in FIG. 9, a spectrum of wavelengths surrounded by a dotted line is selected.

The wavelengths of the laser for the cutting device has relatively low gain. Therefore, it is necessary to increase the gain range. To this end, the length of the resonator, that is the distance between the output mirror 4 and the rear mirror 5, is set large. As a result, the interval between the longitudinal modes, which depends on the resonator length, is reduced. Moreover, since the spectrum has a range of several megahertz, the laser beam has a plurality of longitudinal modes. Namely, the gas laser beam oscillates in multiple longitudinal modes. When the transverse mode of the laser is $TEM_{00}$, in a frequency range between two and fifteen megahertz, no noise is generated. Hence the laser beam is appropriate for cutting the master disc.

In an optical video disc from which a digital sound is also reproduced, a frequency-modulated (FM) analog audio signal and a digital modulation audio signal, more particularly, eight to fourteen modulation (EFM) audio signal are multiplexed in a band lower than the FM video signal. The EFM audio signal occupies the band ranging from several ten kilohertz to about two megahertz. In order to restrain the interference of the EFM audio signal on the FM video signal, the level of the EFM audio signal is multiplexed at a level lower than that of the FM video signal by twenty decibels. Hence when recording a signal having a frequency lower than two megahertz, there may occur a problem that low frequency noise is generated in the cutting device.

SUMMARY OF THE INVENTION

An object of the present invention is to provide an optical recording system where the quality of the recording signal is improved.

According to the present invention there is provided an optical recording system for recording a signal on a recording medium, the system having a gas laser having an optical resonator for emitting a laser beam, an optical modulator for modulating the laser beam in accordance with the signal to be recorded, an optical system for focusing the modulated laser beam on the recording medium so as to record the signal.

The optical resonator has optical means for selecting a single wavelength so that the gas laser oscillates the laser beam in a single longitudinal mode.

The gas laser has a Fresnel number in a range of 4.0 to 5.5, and the optical means comprises an etalon and a wavelength selecting prism.

The other objects and features of this invention will become understood from the following description with reference to the accompanying drawings.

DETAILED DESCRIPTION OF THE PREFERRED EMBODIMENTS

Figure 1:
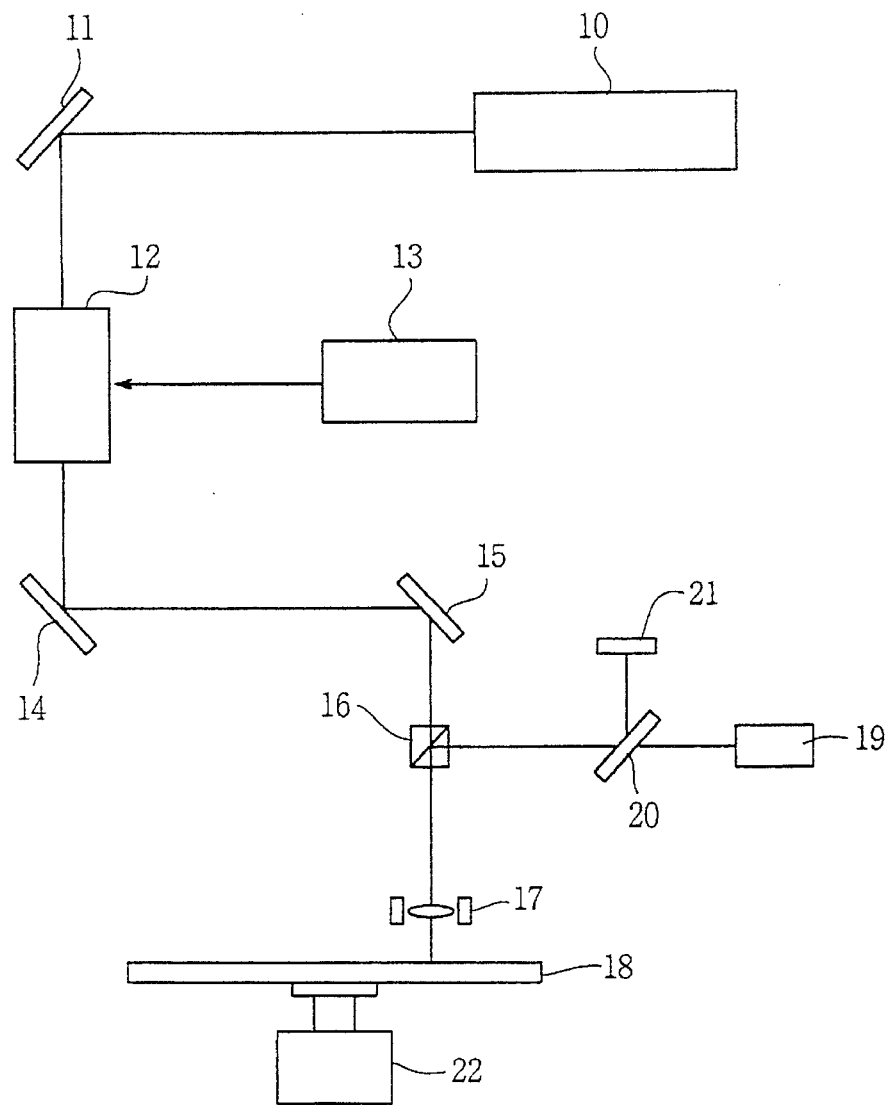
FIG. 1 is a schematic diagram showing an optical recording system of the present invention.

Referring to FIG. 1, an optical recording system according to the present invention for exposing an optical master disc comprises an argon gas laser 10 which emits a laser beam. The laser beam is applied through a reflecting mirror 11 to an optical modulator 12 comprising an acoustic optical modulator (AOM) or an electro-optical modulator (EOM). A recording signal from a recording signal generator 13 is further fed to the optical modulator 12 so that the laser beam is accordingly pulse-modulated or intensity-modulated.

The modulated laser beam is transmitted through an optical recording system comprising a reflecting mirrors 14 and 15, a filter mirror 16, and focused on an optical disc 18 through an objective 17. The optical disc 18 is a master disc for manufacturing a video disc, CD or a writable disc compatible with CDs. The optical disc 18 comprises a glass substrate applied with a photoresist so that when the laser beam is applied to the disc, the photoresist is exposed to record a signal.

The optical recording device further has a laser 19 comprising a helium-neon laser or a diode laser so as to produce a focus error signal. A laser beam emitted from the laser 19 is transmitted through a half mirror 20, the filter mirror 16 and the objective 17 and applied to the optical disc 18. The beam reflected on the disc is applied through the objective 17, filter mirror 16 and the half mirror 20 to a photo detector 21. The detector 21 produces the focus error signal dependent on the reflected beam so as to control the objective 17, thereby constantly accurately focusing the laser beam from the gas laser 10 on the disc 18.

The optical disc 18 is rotated by a spindle motor 22. The reflecting mirrors 11, 14 and 15, optical modulator 12, filter mirror 16, objective 17, laser 19, half mirror 20 and the detector 21 are mounted on a mobile carrier so as to be moved in a radial direction of the disc.

When producing a master disc for an optical video disc, the recording signal generator 13 generates a frequency-multiplexed signal comprising an FM video signal and an analog FM audio signal and EFM audio signal multiplexed in a band lower than the FM video signal. In the case of a master disc for a CD, an EFM audio signal is generated, and in the case of a master disc for a writable disc compatible with CDs, a signal for forming a wobbled groove is generated by the recording signal generator 13.

Figure 2:
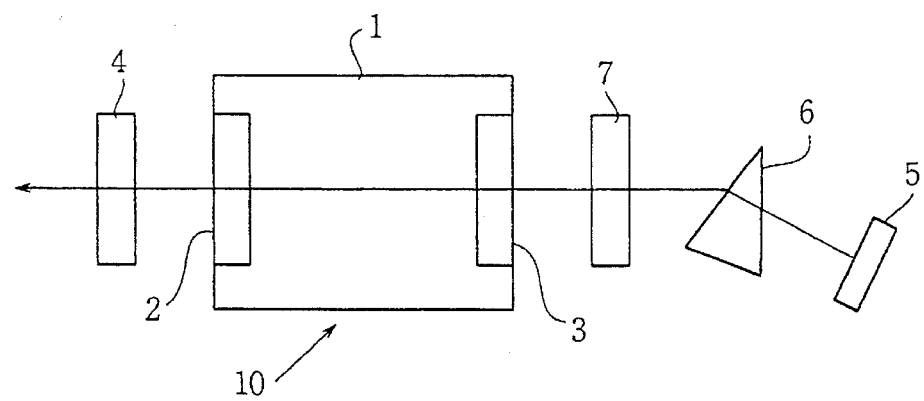
FIG. 2 is a schematic diagram showing an argon gas laser provided in the optical recording system of FIG. 1.
Figure 8:
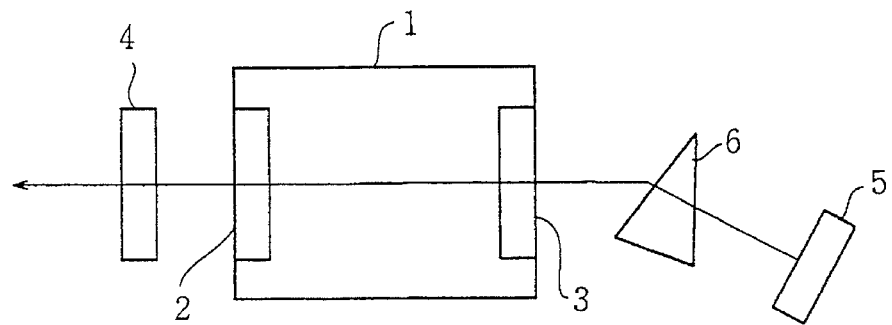
FIG. 8 is a schematic diagram showing an argon gas laser provided in a conventional optical recording system.
Figure 9:
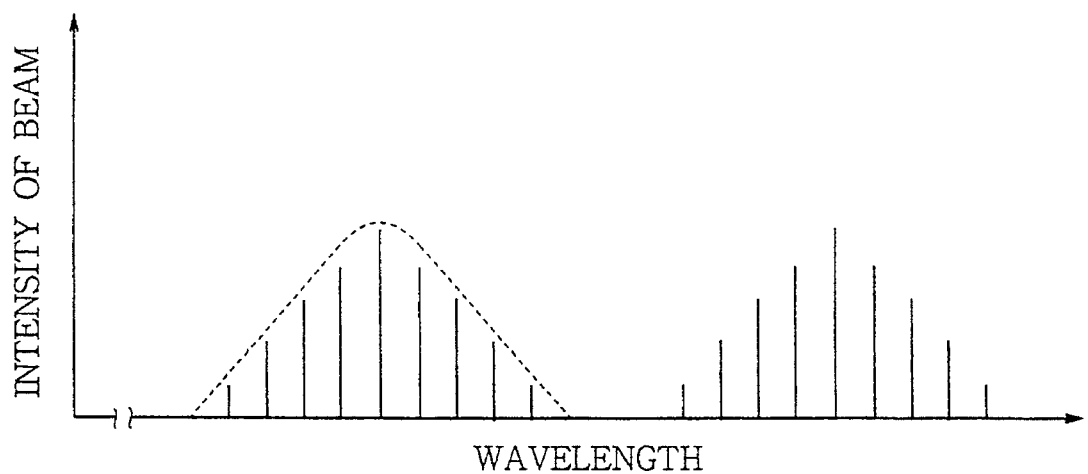
FIG. 9 is a graph sowing longitudinal modes of the argon gas laser of FIG. 8.

FIG. 2 shows the gas laser 10 of the present invention. The same references as those in FIG. 8 designate the same parts in FIG. 2. The gas laser 10 comprises the discharge tube 1 filled with argon gas and having the first and second apertures 2 and 3 at the both ends thereof. The partially reflecting output mirror 4 confronts the first aperture 2 and the total reflecting rear mirror 5 is provided at an end of the beam path, thereby forming an optical resonator. An etalon 7 and the wavelength selecting prism 6 are provided between the second aperture 3 and the rear mirror 5 so as to select only one wavelength.

Figure 3:
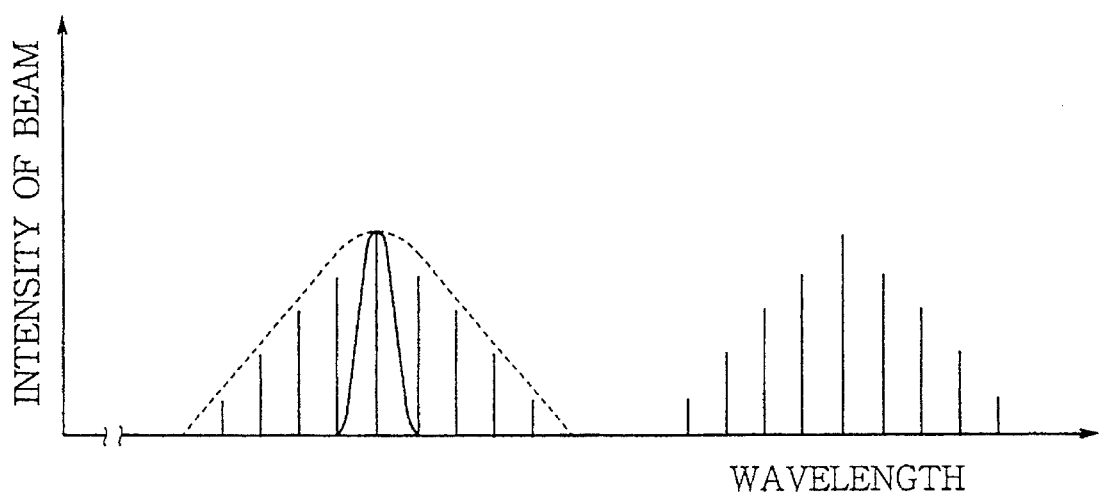
FIG. 3 is a graph showing a longitudinal mode of the argon gas laser of FIG. 2.

When the discharge tube 1 is excited, a laser beam is generated with a wide spectrum. The wavelength selecting prism 6 selects a spectrum surrounded by a dotted line in the graph of FIG. 3. Since the etalon 7 is further provided, the beam having a predetermined single wavelength as surrounded by a solid line in FIG. 3 is selected. Namely, the gas laser 10 emits a laser beam oscillating in single longitudinal mode. The laser beam has a high beam intensity.

Figure 4:
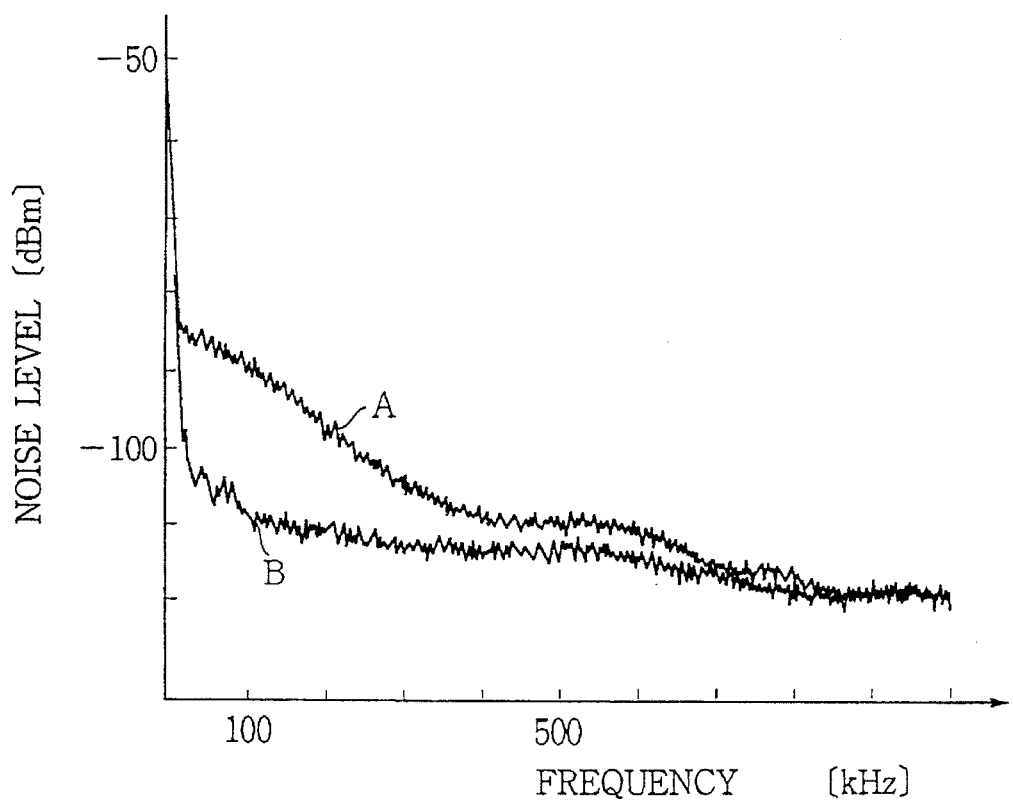
FIG. 4 is a graph showing the relationship between the noise level and the frequency of the argon gas laser.

Referring to FIG. 4 showing a frequency response of noise in the argon gas laser beams. The reference A indicates the response of the laser beam in multiple longitudinal modes, that is a laser beam generated by the conventional gas laser of FIG. 8, and B indicates the response of a laser beam in a single longitudinal mode, that is a laser beam of the gas laser of FIG. 2 of the present invention. In order to obtain the responses, the argon gas laser beam in each case was applied to a high-speed detector, the output of which was fed to a spectrum analyzer. As shown by the graph, in a frequency range lower than one megahertz, noise in the single longitudinal mode laser beam is decreased compared to that of a multiple longitudinal mode beam.

Figure 5:
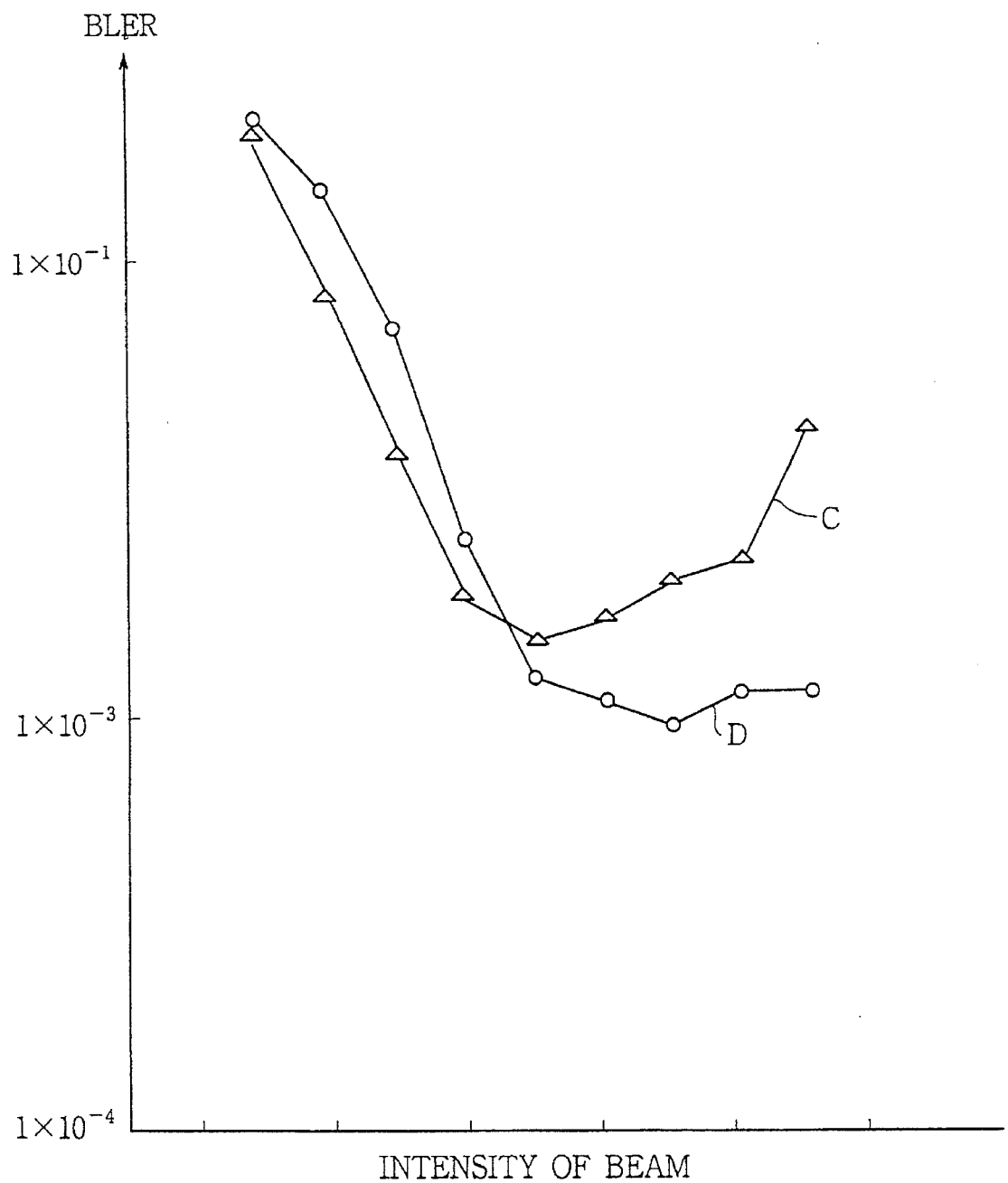
FIG. 5 is a graph showing the relationship between the intensity of the laser beam and the block error rate in an EFM audio signal recorded on a disc.

FIG. 5 shows the relationship between the intensity of the laser beam and a block error rate (BLER) in a signal recorded on the disc. C shows the BLER of an EFM audio signal recorded with the multiple longitudinal mode laser beam, and D shows the BLER of the EFM audio signal recorded with the single longitudinal mode laser beam. It is evident from the graph that the minimum BLER value of D is smaller than that of C. The intensity of the laser beam is usually set at a level where the BLER is minimized.

Figure 6:
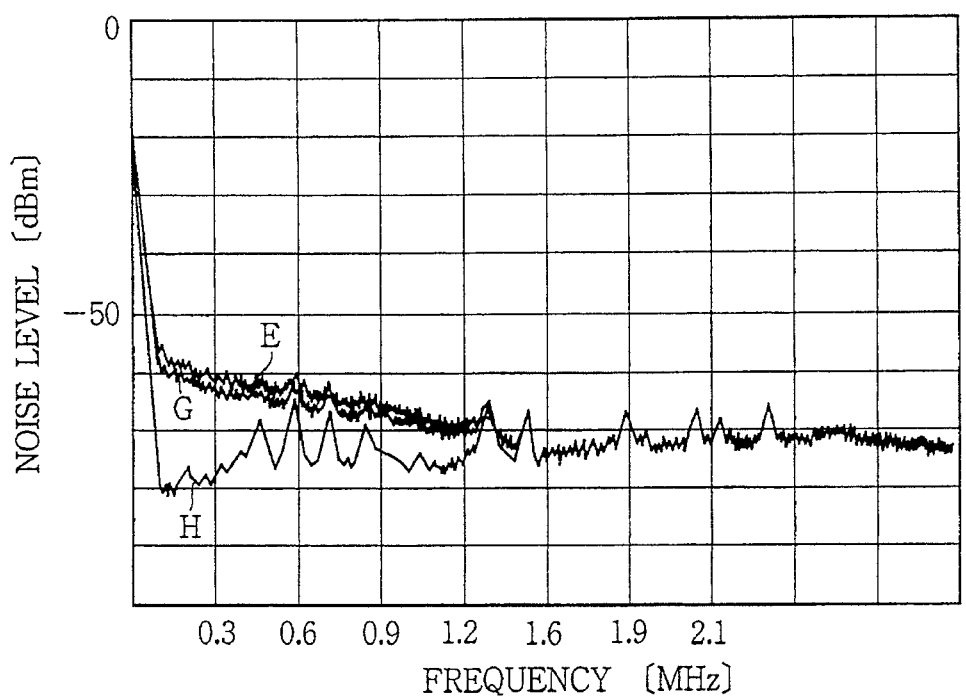
FIG. 6 is a graph showing the relationship between the noise level and the frequency in a signal for forming a wobbled groove on a disc.

FIG. 6 shown a frequency response of a groove noise of a wobbled groove which wavers periodically in the radial direction of the disc 18 at about 20 kilohertz. E and G indicate the noise levels of a multiple longitudinal mode laser beam and a single longitudinal mode laser beam, respectively, and H shows the level of the background noise. The noise level of G is lower than that of E as shown in the graph.

Thus it can be seen that the beam in the single longitudinal mode emitted from the gas laser having an etalon and wavelength selecting prism has less noise, in particular in a frequency range under one megahertz. Thus the BLER in the recorded signal is reduced.

In the above described embodiment, the Fresnel number F of the gas laser 10 is set to 2.5, that is, the transverse mode of the produced laser beam is strictly $TEM_{00}$. The Fresnel number F is expressed as, $$F = S/L\lambda$$

wherein S is an area of the first aperture 2, L is the length of the optical resonator, and $\lambda$ is the wavelength of the laser beam. Since the diameter of the output of the laser beam is determined based on the sectional area of the luminous flux emitted from the first aperture 2, the Fresnel number F is proportional to the sectional area of the luminous flux and inversely proportional to the length L of the optical resonator and to the wavelength $\lambda$ of the laser beam. The output of the laser beam is also proportional to the sectional area of the luminous flux.

The output of the laser beam oscillating at the single longitudinal mode is decreased by one half than that of the beam at the multiple longitudinal mode. Hence the laser beam may not have an output large enough for cutting a master disc. In order to solve this problem, the Fresnel number F of the gas laser is increased by enlarging the area of the first aperture 2, and hence increasing the output diameter of the luminous flux.

Figure 7:
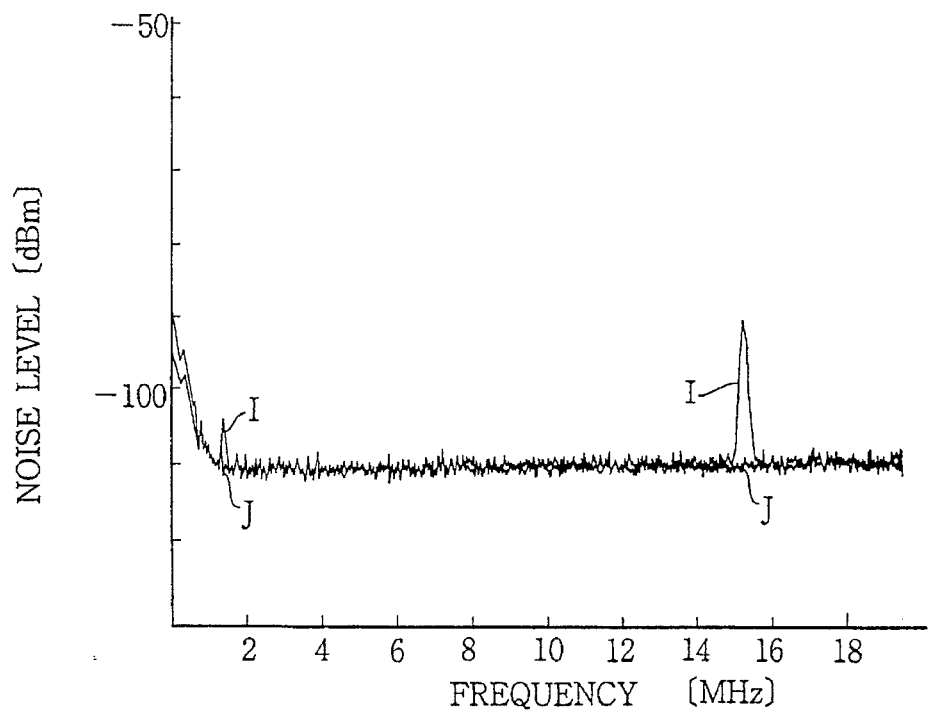
FIG. 7 is a graph showing the relationship between the noise level and the frequency of the argon gas laser having a larger Fresnel number.

FIG. 7 shows a frequency response of noise from an argon laser where the Fresnel number F is increased to 4.8. The reference I indicates the response when the beam is in a multiple longitudinal mode and J indicates the response when in a single longitudinal mode. As shown by the graph, in the case of the reference I, when the transverse modulation mode is not strictly $TEM_{00}$ so that the Fesnel number is not 2.5, due to the resonance of the longitudinal and transverse modes, noise is generated at an interval of several ten megahertz. On the other hand, in the case of J, the noise does not generate although the Fresnel number is 4.8. Namely, noise does not occur provided the transverse mode is sufficiently small as to maintain the Fresnel number in the range between 4.0 and 5.5. Consequently, the decrease in the output of the argon gas laser source can be compensated without causing noise.

The present invention may be further applied to gas lasers such as a krypton gas laser.

From the foregoing it will be understood that the present invention provides an optical recording system having a gas laser which oscillates a beam in single longitudinal mode, so that the noise level in a frequency range lower than one megahertz is reduced, thereby improving the quality of the recorded signal.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical recording system for recording a signal on a recording medium, the system comprising:

a gas laser having an optical resonator, for emitting a laser beam and said gas laser having a Fresnel number in a range of 4.0–5.5;

an optical modulator for modulating the laser beam in accordance with the signal to be recorded;

an optical system for focusing the modulated laser beam on the recording medium so as to record the signal, wherein the optical resonator has optical means for selecting a single wavelength so that the gas laser oscillates the laser beam in a signal longitudinal mode, and wherein the signal to be recorded includes a signal having a frequency lower than two megahertz.

2. The optical recording system according to claim 1 wherein the optical means comprises an etalon and a wavelength selecting prism.

3. The optical recording system according to claim 1 wherein the signal to be recorded is a digital audio signal.

4. The optical recording system according to claim 1 wherein the signal to be recorded is a signal for forming a wobbled groove.

5. The optical recording system according to claim 1 wherein the gas laser has a Fresnel number in a range of 4.0 to 5.5, and the optical means comprises an etalon and a wavelength selecting prism.

6. The optical recording system according to claim 1, wherein said optical resonator including a discharge tube having first and second apertures, said first aperture is larger than said second aperture.

\* \* \* \* \*